INVENTOR.
NORMAN WAIL, DECEASED
BY LEE WAIL
ADMINISTRATRIX
BY Herbert L. Davis
ATTORNEY March 30, 1965          N. WAIL          3,176,264
WARNING AND MONITORING SYSTEM
Filed Sept. 29, 1961          3 Sheets-Sheet 3

INVENTOR.
NORMAN WAIL, DECEASED
BY LEE WAIL,
ADMINISTRATRIX
BY Herbert L. Harris
ATTORNEY

United States Patent Office 3,176,264
Patented Mar. 30, 1965

3,176,264
WARNING AND MONITORING SYSTEM
Norman Wail, deceased, late of Ridgefield, N.J., by Lee Wail, administratrix, Ridgefield, N.J., assignor to The Bendix Corporation, Teterboro, N.J., a corporation of Delaware
Filed Sept. 29, 1961, Ser. No. 141,909
7 Claims. (Cl. 340—27)

The invention relates in general to a signal monitoring system and more particularly to measurement and monitoring of the difference between two incoming signals.

An object of the invention is to monitor the variation between two separate signal sources.

Another object of the invention is to monitor the variation between two separate sources, and provide a warning signal for a fixed deviation between the sources.

Another object of the invention is to provide a monitor for the variation between two independent signals and to quantitatively measure the difference between them.

Another object of the invention is to monitor the variation in Mach number received from two separate and independent sources and provide a warning signal for a fixed Mach number deviation between the sources.

Another object of the invention is to provide a monitor for the variation in Mach number from separate and independent sources and to quantitatively measure the difference between the Mach number.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the system there is provided a conventional electrical differential device shown here as an E-pickup device having two members and so arranged that an incoming signal is applied through a differential synchro to a transferring device such as a servo, which positions the E-core proportional to the input signal. A second independent signal, or signal which is to be compared, is mechanically applied to the armature of the E-pickup device so as to cause the armature to move in an amount proportional to the signal. When the core and the armature are not aligned an electrical error signal is transmitted from the E-pickup device. The incoming signals are so connected to the E-pickup device that equal signals produce the same displacement in the core and armature; thus producing no error signal. However, incoming signals of different strength will produce an error signal through the foregoing arrangement.

Figure 1:
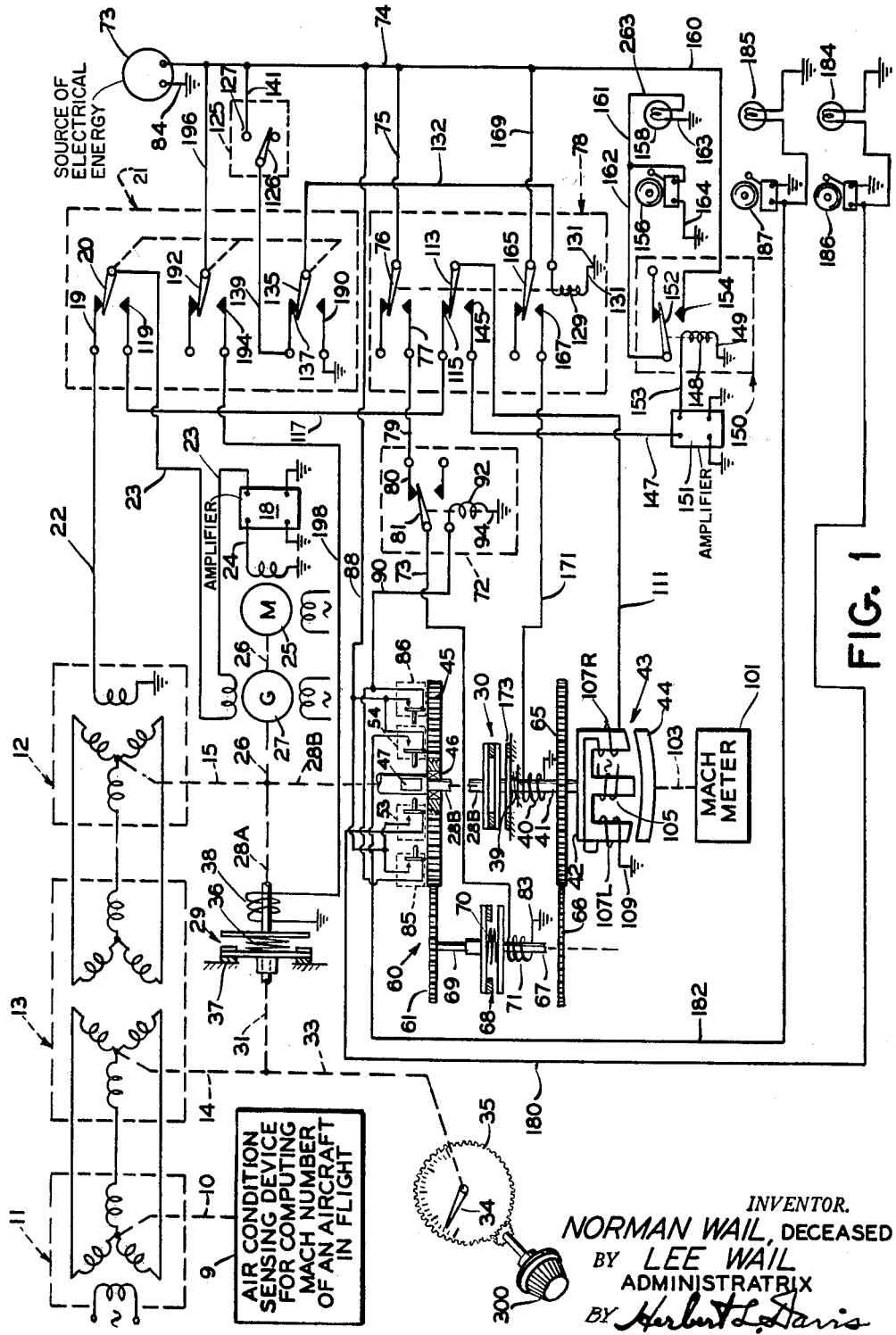
FIGURE 1 is a schematic wiring diagram of a system embodying the invention.

Referring to the drawing of FIGURE 1, the invention is shown, for purpose of illustration, as monitoring the difference in Mach number as received from two separate independent sources, such as for example, an Air Data Signal source and a Mach meter.

An air data signal representing the Mach number of an aircraft in flight may be computed by an air data computer or air condition sensing device 9 which may be of a type such as disclosed and claimed in U.S. Patent No. 2,969,910 granted January 31, 1961 to Paul L. Reuter and assigned to The Bendix Corporation. The device 9 may position a rotor shaft 10 of a synchro 11 in accordance with the computed Mach number and such signal may in turn be applied to a receiver control transformer synchro 12. The signal transmitter 11 and a differential synchro 13 are connected together in tandem with the receiver synchro 12 and placed back to back with the differential transformer 13 having a rotor winding adjustably positioned by a shaft 14. When so arranged, the amount of rotation of a shaft 15 of the rotor of the receiver control transformer synchro 12 effected by a controlling servomotor is equal to the arithmetic sum of the rotations of the two shafts 10 and 14 of the signal transmitter synchro 11 and differential synchro 13, respectively.

An electrical output from the receiver synchro 12 is selectively connected to an amplifier 18 through contact 19 and switch arm 20 of an operator-operative switch mechanism 21. The signal output from synchro 12 is applied through conductor 22 and a grounded output connection to the input of the amplifier 18 through a grounded connection and a conductor 23 leading from switch arm 20. The output of the amplifier 18 is in turn applied through a grounded output connection and output line 24 to a control winding of a servo motor 25. The motor 25 may be of a conventional two-phase reversible type arranged to control rotation of a shaft 26 which is operatively connected to the rotor shaft 15 of the receiver control transformer synchro 12. The motor 25 drives the rotor of the receiver control transformer 12 to a null position by means of shaft 15 thereby removing the signal that is being fed into the amplifier 18 and controlling the rotation of the motor 25. At the same time, the motor 25 mechanically positions the shaft 26 proportional to the Mach number signal as received from the air data computer 9.

As shown in the drawing, the motor 25 also drives through shaft 26 a rate generator 27 of a conventional type arranged to apply to the amplifier 18 through the input line 23 a counter electro-motive force tending to prevent the motor 25 from overshooting or hunting as explained in a now expired Riggs U.S. Patent No. 2,115,086 granted April 26, 1938.

In addition to the shaft 15, there are also operatively connected to the output drive shaft 26 of the servo motor 25, shafts 28A and 28B of friction clutches 29 and 30 respectively. The clutch 29 is operative to drivingly connect shaft 28A driven by motor 25 to a shaft 31 which is in turn operatively connected to both shaft 14 of the differential synchro 13 and a shaft 33 for positioning a pointer 34 in cooperative relation with a Mach number indicator dial 35. The clutch 29 is biased by a spring 36 to a normally clutch open position with the side of the clutch 29 attached to shaft 31 and thereby to shafts 14 and 33 locked by a friction plate 37 to ground upon a controlling electromagnetic winding or solenoid 38 being deenergized. However, upon the electromagnetic winding 38 being energized, as hereinafter explained, the clutch 29 is biased thereby into an operative relation for drivingly connecting the output drive shaft 26 of the servo motor 25 to the shafts 14 and 33. However, through the locking action of the biasing spring 36 and friction plate 37 on the shaft 31 the mechanical input 14 to the differential synchro 13 as well as the Mach indicator pointer 34 are prevented from moving until an energized signal is applied to the solenoid 38 controlling the friction clutch 29 and releasing the locking action of the friction plate 37 on the shaft 31.

Friction clutch 30 is biased by a spring 39 to a normally clutch engaging position upon deenergization of a clutch controlling solenoid or electromagnetic winding 40 so as to operatively connect the servo motor drive shaft 28B through a shaft 41 to an E-core 42 of an E-pickup device 43 of conventional type and having a movable armature portion 44. As heretofore explained, the shafts 26 and 28B are positioned by the servo motor 25 proportional to the incoming computer Mach number signal so that upon the solenoid 40 being deenergized, the E-core 42 is positioned through the engaged friction clutch 30 proportional to the computed Mach number signal provided by the signal device 9 while upon energization of the controlling solenoid 40 the clutch 30 is biased to a disengaged position disconnnecting the E-core 42 from the shaft 28B driven by the servo motor 25. As hereinafter explained, the E-core 42 is locked in a fixed position by a friction plate 173 when the clutch 30 is biased to a disengaged position by the energization of the solenoid 40.

Figure 2:
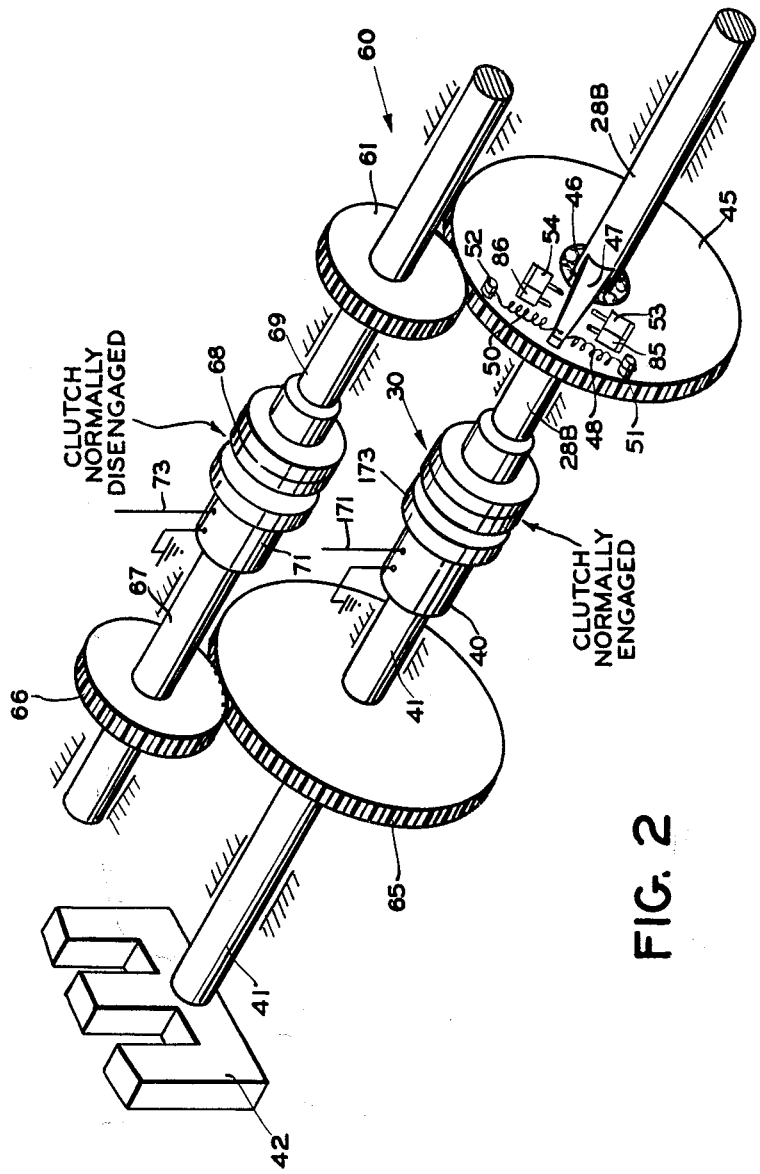
FIGURE 2 is an enlarged detail perspective view of a double clutch drive assembly for an electrical pickup and warning switch embodied in the system of FIGURE 1 and in which corresponding parts have been designated by like numerals.

As shown in FIGURE 2, an idler gear 45 is rotatably mounted on roller bearings 46 carried by the shaft 28B in such a manner that the idler gear 45 may be rotated independently of the rotation of the shaft 28B, while the idler gear 45 is restrained by the roller bearing mounting from axial movement along the length of the shaft 28B. An actuating arm 47 is mounted perpendicular to the axis of the shaft 28B and is operatively connected at its free end to the idler gear 45 through two centering springs 48 and 50 connected to the free end of the arm 47 and at opposite ends to pins 51 and 52 projecting from the idler gear 45. Two normally open switches 53 and 54 of conventional type are mounted on the idler gear 45 and are so arranged that upon the shaft 28B and idler gear 45 rotating relative one to the other, the actuating arm 47 carried by the shaft 28B will selectively actuate one or the other of the switches 53 or 54 to a circuit closed position dependent upon the rotary movement of the shaft 28B relative to the idler gear 45 in a counter clockwise or clockwise direction as the case might be.

A secondary gear train 60 including a gear 61 drivingly engaged by the idler gear 45 operates in such a manner that upon clutch 30 being biased to the disengaged position by the energization of solenoid 40, and a clutch 68 being biased to an engaged position by the energization of a controlling solenoid 71, the idler gear 45 is held in a fixed position while the shaft 28B, to which is attached the actuating arm 47, rotates relative to the idler gear 45 being driven by shaft 26 of the servo motor 25.

The secondary gear train 60 includes a gear 65 fixedly mounted on the shaft 41 and drivingly engaging a gear 66 fixedly mounted on a shaft 67 which may be drivingly connected through the friction clutch 68 to a shaft 69, upon which is fixedly mounted the gear 61 which in turn engages the teeth of the idler gear 45.

The friction clutch 68 is biased by a spring 70 into a disengaging relation upon deenergization of the controlling solenoid or electromagnetic winding 71 while upon energization of the controlling solenoid 71 the clutch 68 is biased into engaging relation. The energization of the solenoid 71 is effected by the closing of relays 72 and 78 which operatively connect a suitable source of electrical energy 73 through conductors 74 and 75, closed contacts 76 and 77 of relay 78, through conductor 79, contacts 80 and 81 of relay 72, and through conductor 73 to solenoid 71 controlling clutch 68 and returning through grounded connection 83 to the grounded connection 84 at the source of electrical energy 73.

The circuit controlling the energization of the solenoid 71 may be opened by the selective operation of either of two normally open safety or limit switches 85 or 86 mounted on the idler gear 45 to one side of the switches 53 and 54, as shown in FIGURE 2. The position of the switches 85 and 86 relative to the actuating arm 47 is such that upon the actuating arm 47 continuing to move relative to the idler gear 45 in the same direction after closing one or the other of the switches 53 or 54, it will selectively close the switch 85 or 86 adjacent to the closed switch 53 or 54, as the case may be, so as to effectively connect the source of electrical energy 73 through conductors 74, 88 and 90 to a solenoid or electromagnetic winding 92 of the relay 72. The winding 92 is further connected through a grounded connection 94 to the grounded connection 84 of the source 73. Energization of the winding 92 will cause the relay contact 81 to open contact 80 thereby breaking the path of conduction between the source of excitation 73 and the solenoid 71 controlling the clutch 68. With the source of electrical energy 73 no longer being applied to the control solenoid 71 the clutch 68 will open under the biasing force of spring 70 and permit gear 45 to move freely relative to shaft 28B, and the center return springs 48 and 50 to return the idler gear 45 to a central position relative to the actuating arm 47.

As distinguished from the air condition sensing device 9, there is further provided a Mach meter 101 which may be of a type disclosed and claimed in U.S. Patent No. 2,985,012 granted May 23, 1961, to Norman Wail and assigned to The Bendix Corporation. The Mach meter 101 may mechanically position through a shaft 103 the armature portion 44 of the E-pickup 43 as a function of Mach number.

The E-pickup device 43 is of a conventional type including the armature or magnetic control vane 44 and an E-core 42 having an energizing winding 105 connected across a suitable source of alternating current and inductively coupled to control windings 107L and 107R operatively arranged in opposing relation and electrically connected to a ground connection 109 and through a conductor 111 to a switch arm 113 of the relay 78. The E-core 42 and the armature 44 are adustably positioned relative one to the other by the servo motor 25 under control of the air condition sensing device 9 and the Mach meter 101 respectively, so as to control the phase and magnitude of the alternating current induced in the windings 107L and 107R depending upon whether the Mach number computed by the device 9 be greater or less than that computed by the Mach Meter 101.

Thus should the Mach Meter 101 and the air condition sensing device 9 provide unequal signals then the armature 44 and the core 42 of the E-pickup device 43 will be displaced in unequal amounts, and the control winding 105 of the E-pickup device 43 will induce in the opposing windings 107L and 107R an error signal. This error signal is then fed through conductor 111 to switch arm 113 of relay 78 which is normally biased under spring tension to close a relay contact 115 which is in turn connected by a conductor 117 to a contact 119 arranged to cooperate with the switch arm 20 of the operator-operative switch mechanism 21.

As illustrated in FIGURE 1 the switch arm 20 is shown in an open position relative to the contact 119 and in a closed position relative to the contact 19 which is the condition of the switch mechanism 21 prior to the operation of the Mach warning and the monitoring system.

There is provided in the warning and monitoring system the operator-operative switch mechanism 21 and a second operator-operative switch mechanism 125 which switch mechanisms perform two distinct operations. Operation of the switch mechanism 125 by the movement of switch arm 126 to close contact 127 is effective through the aforenoted system to provide a warning signal for a given deviation of a Mach number from that of the Mach number of the aircraft prevailing at the time the switch mechanism 125 is initially operated. In distinction operation of switch mechanism 21 (momentary operation) is effective through the monitoring system to provide a quantitative measure of the deviation in the Mach number of the aircraft from that of the Mach number effective on the initial operation of the switch mechanism 125, and also may be used to monitor any variations between the separate sources.

The operation of the switch mechanism 125 causes the switch arm 126 to close the contact 127, thereby energizing a control solenoid or electromagnetic winding 129 of the relay 78. One end of the winding 129 is ground connected at 131 and through the grounded conductor 84 is connected to one terminal of the source of electrical energy 73 while the winding 129 is connected at the opposite end thereof through a conductor 132 to a switch arm 135 of the switch mechanism 21 normally in the position shown in FIGURE 1 in which the switch arm 135 is effective to close a switch contact 137 which in turn is connected through a conductor 139 to the arm 126 which in the operation of the switch mechanism 125 closes the contact 127 connected through a conductor 141 and the conductor 74 to the source of electrical energy 73.

Energization of the control solenoid 129 thus effected by the operation of the switch mechanism 125 causes the switch arm 113 of the relay 78 to open contact 115 and close a contact 145 connected by a conductor 147 to an amplifier 151 the output of which is applied through a conductor 153 to one end of a control solenoid or electromagnetic winding 148, the opposite end of which is connected across the output of the amplifier 151 through a ground connected conductor 149. The control windings 107L and 107R of the E-pickup device 42 are effectively connected to the input of the amplifier 151 through the ground connected conductor 109, conductor 111, switch arm 113, contact 145 and conductor 151 and through the amplifier 151 to the electromagnetic winding 148 of a relay 150. Thus, upon an error signal being induced in the control windings 107L and 107R of the E-pickup device 43 in excess of a predetermined value, the error signal will thereupon become effective to sufficiently energize the electromagnetic winding 148 so to cause a relay switch arm 152 operated thereby to close a switch contact 154 to effectively energize a warning system including audible and visual indicating devices such as bell 156 and light 158. The bell 156 and light 158 being thereby effectively energized by the source of electrical energy 73 through conductor 74, conductor 160, contact 154, closed switch arm 152, a conductor 162 and grounded conductor 164, and conductor 161 and grounded conductor 163.

Figure 3:
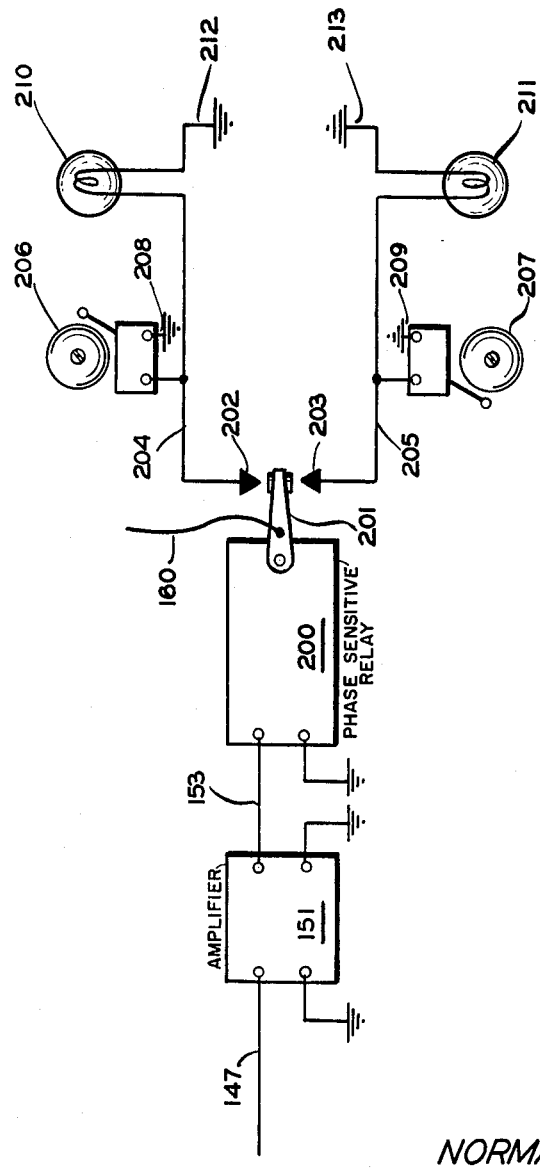
FIGURE 3 is a wiring diagram of a modification of a portion of the wiring diagram of FIGURE 1 and showing a modified form of warning system for visually and audibly warning of an increase and decrease in the sensed Mach number above or below a preset value and in which modification corresponding parts to those shown in FIGURE 1 have been designated by like numerals.

In the modified form of the invention, shown in FIGURE 3, there may be substituted for relay 150 a phase sensitive relay 200 of a conventional type responsive to the error signal from the E-pickup device 43 applied through the conductor 147 and which as, heretofore explained, is an alternating electrical current whose phase is controlled by whether the Mach number computed by the device 9 is greater or less than that computed by the Mach meter 101. The magnitude of the alternating error signal depends upon the magnitude of the Mach number as computed by the device 9 and as computed by the meter 101. Thus, upon the error signal applied at the control windings 107L and 107R of the E-pickup device 43 exceeding a predetermined value, both in magnitude and phase shift, the error signal will successfully energize the phase sensitive relay 200 so as to actuate a relay switch arm 201 operated thereby to close either one or the other of the switch contacts 202 or 203 in accordance with the phase shift of the error signal to effectively energize either of the two parallel warning systems each of which may include an audible and visual indicator device such as a bell 206 and 207 and a light 210 and 211. The bell 206 and the light 210, being effectively energized by the source of electrical energy 73 through conductor 160 selectively connected by the relay switch arm 201 to contact 202, conductor 204 through the bell 206 to grounded conductor 208, and conductor 204 to the lamp 210 and grounded conductor 212; or if the phase shift of the error signal is of the opposite sense or polarity, the source of electrical energy 73 is selectively connected through conductor 160 and relay switch arm 201 to contact 203, conductor 205 to bell 207 and through the bell 207 to grounded conductor 209; and through conductor 205 to lamp 211 and thence therethrough to grounded conductor 213.

The energization of the control solenoid 129 of the relay 78 effected by the closure of the switch mechanism 125 also causes a relay switch arm 165 to close a switch contact 167 to effectively connect the source of electrical energy 73 through conductors 74 and 169, switch arm 165 and contact 167, and conductor 171 to the solenoid 40 controlling the friction clutch 30. Upon energization of solenoid 40 the clutch 30 disengages, and the side of the clutch connected to shaft 41 is locked to ground by a friction plate 173 to prevent rotation, thus locking the E-core portion 42 of the E-pickup device 43 in a fixed position.

It will be further seen that energization of the control solenoid 129 effected by the closure of the switch mechanism 125 will also cause the relay switch arm 76 to close the contact 77 effecting energization of the solenoid 71 to close clutch 68, as heretofore described, whereupon the idler gear 45 cannot rotate, being held fixed by gear 61, shaft 69, shaft 67 and gear 66 engaged to gear 65 on shaft 41 which is attached to the side of clutch 30 which is locked to ground by plate 173 under the biasing force of the solenoid 40 controlling the clutch 30 and energized by the closing of the contact 167 by the relay switch arm 165 upon the aforesaid energization of the relay control solenoid 129.

With switch 125 closed, any change in the speed or Mach number of the aircraft greater than a predetermined value will be immediately indicated by a bell warning and light warning effected by the system. The warning system is effective to indicate to the pilot (1) a change in the aircraft's Mach number (2) whether the speed is increasing or decreasing and (3) whether both Mach number indicating signals are in agreement.

In the last-mentioned mode of operation with switch arm 126 closing contact 127, deviation in speed (i.e. Mach number) of the aircraft as received through the Mach Meter 101 will result in a position change of the armature 44, and an error signal will be applied through the amplifier 151 to the sensitive relay 150, shown in FIGURE 1, which upon the speed exceeding a predetermined value or decreasing below a predetermined value will effect energization of the warning bell 156 and light 158.

In the modified form of the invention shown by FIGURE 3, the phase sensitive relay 200, as heretofore explained, may selectively effect energization of one of the sets of warning devices such as the bell 206 and light 210 upon the speed of flight of the aircraft exceeding a predetermined value and effect energization of the other of the sets of warning devices such as the bell 207 and light 211 upon the speed of flight of the aircraft decreasing below a predetermined value.

Moreover, as shown in FIGURE 1, variation in the speed as reported by the air data computer or air condition sensing device 9 will be fed to the servo motor 25 which will rotate shaft 26 and thereby shaft 28B to actuate arm 47 in opposition to the centering springs 48 and 50 to close the switch 53 or 54 to thereby transmitting a signal from the source of electrical energy 73 through conductors 74 and 88 and conductor 180 or 182, dependent upon whether switch 53 or 54 is closed, to the sensitive indicating lamps 184 or 185 and bells 186 or 187. Thus change in aircraft speed may be thereby indicated. The pilot can quickly determine if both speed signals record the change in speed by observing if both bells 156 and 186 or 187 are ringing, the former indicating a Mach number change on the Mach meter 101, the latter Mach number change on the air data computer 9.

Mechanical rotation of shaft 26 is proportional to change in Mach number as received by the air data computer 9.

Switches 53 and 54 are located on the idler gear 45 a predetermined number of degrees off center and are so arranged that the actuating arm 47 mounted on shaft 28B will reach the switch 53 or 54 a predetermined number of degrees of rotation of the shaft 28B relative to the idler gear 45 and corresponding to a predetermined change in Mach number. Any change in Mach number less than this specified amount will not rotate the shaft 28B relative to the idler gear 45 sufficiently to have the arm 47 close the contacts of switch 53 or 54.

Furthermore, an increase in an air data signal will cause a rotation of the shaft 28B in one direction (and a decrease in the other direction). Different lamps 184 or 185 and bells 186 or 187, shown in FIGURE 1, will register depending on whether the change in Mach number is an increase or decrease.

To determine how much the craft's Mach number changes since the time the relay switch 78 was closed by the operation of the switch 125; or to continue monitored flying at a new speed, the pilot may actuate the operator-operative switch mechanism 21 from the position shown in FIGURE 1 to a second position in which switch arm 20 opens contact 19 and closes the contact 119, switch arm 135 opens contact 137 and closes a grounded contact 190 while a third switch arm 192 closes a contact 194 to connect the source of electrical energy 73 through conductors 74, 196, and 198 to the control solenoid 38 to engage the frictional clutch 29, as heretofore explained.

Such operation of the switch mechanism 21 performs the following operations simultaneously:

(1) Transfers the control of the input signal to the amplifier 18 from the air data computer or air conditioning sensing device 9 to the E-pickup device 43 operated by the Mach meter 101.

(2) Effectively engage clutch 29 by causing switch arm 192 to close contact 194 to energize the clutch control solenoid 38.

(3) De-energize the relays 78 and 150 in the event energization thereof has been effected by the closure of switch mechanism 125.

The operations may be traced as follows:

(1) The error signal resulting due to a difference in position between the E-core 42 and the armature 44 of the E-pickup device 43 is applied to the amplifier 18 through conductor 111, switch arm 113 and contact 115 of relay 78, through conductor 117, through contact 119 and arm 20 of switch mechanism 21 and then through conductors 23 to the input of the amplifier 18.

(2) An excitation is applied to solenoid 38 controlling clutch 29 from the source of excitation 73 through conductors 74 and 196 through switch arm 192 and contact 194 of the switch mechanism 21 and then through conductor 198 to the solenoid 38 controlling clutch 29.

(3) Relay 78 is de-energized if the switch 21 has been thus operated since solenoid 129 of relay 78 is connected through conductor 132 to switch arm 135 of switch mechanism 21 and therethrough to contact 190 connected to ground to de-energize relay 78.

The error signal from the E-pickup device 43, referred to in the first operation above, is nulled by the servo motor 25 driving shaft 28B and through clutch 30 now in a clutch engaging position through the shaft 41 to position the E-core 42 of the E-pickup 43 to a null signal position relative to the armature 44.

At the same time, clutch 68 being de-energized by the opening of switch contacts 76 and 77 and thus disengaged the gear 45 may rotate freely with respect to shaft 28B, and the center return springs 48 and 50 serve to position gear 45 so that actuating arm 47 of shaft 28B becomes and remains centered with respect to the gear 45.

Referring to the aforenoted operation, the closing of clutch 29 connects shaft 26 of the synchro follow-up 25 through shafts 28A and 31 to shafts 14 and 33 of the differential synchro 13 and Mach indicator output pointer 34. It will be seen then that while the E-pickup device 43 is being driven to null through clutch 30 and shaft 41, the differential synchro 13 through the operation of shaft 14 is cancelling out the change in position of rotor shaft 15 of the signal receiver synchro 12. The pointer 34 cooperating with the Mach number indicator dial 35 is positioned by an amount required for the E-core 42 to be aligned with the vane or armature 44 of the E-pickup device 43, thereby indicating the difference in positions of the E-core 42 and the E-vane 44. Since the vane 44 was positioned by the Mach meter 101 and the E-core 42 was positioned by the air data computer 9 the indicator 34-35 records the difference between the two sources, which, in effect, monitors the variation of the two sources. A hand set 300 is supplied to manually reposition the dial 35 relative to the pointer 34 to a predetermined neutral position.

Upon the operator releasing the switch mechanism 21, the switch arms 20, 135 and 192 may be biased under spring tension to the position shown in FIG. 1 whereupon the Mach number warning and monitoring system is automatically set up to give a Mach number warning upon the operator closing the switch mechanism 125 or the operator may operate the warning portion of the system by reclosing momentarily the switch mechanism 21.

Although only two embodiments of the invention have been illustrated and described, various changes in the form and relative arrangements of the parts, which will appear to those skilled in the art may be made without departing from the scope of the invention. Reference is, therefore, to be had to the appended claims for a definition of the limits of the invention.

What is claimed is:

1. A monitoring system comprising first means to sense an operative condition of an aircraft, second means to sense said condition, servomotor means, operator-operative switch means operable in one sense to operatively connect said first sensing means to said servomotor means to control the operation thereof, a differential device having two input members movable relative one to the other and a signal output means, clutch means rendered effective by the operation of said switch means in said one sense to operatively connect said servomotor means to said one input member of said differential device, said second sensing means being operatively connected to the other input member of said differential device, indicator means, said operator-operative switch means being operable in another sense to disconnect said first sensing means from control of the operation of said servomotor means and to connect the signal output means of said differential device to said servomotor means to control the operation thereof, and other clutch means rendered effective by the operation of said switch means in said other sense to operatively connect said servomotor means to said indicator means to effect operation thereof to indicate any difference between said condition as thereafter sensed by said second sensing means from that sensed by the first sensing means at the time of operation of the operator-operative switch means in said other sense.

2. A warning and monitoring system comprising first means to sense an operative condition of an aircraft, second means to sense said condition, servomotor means, operator-operative switch means operable in one sense to operatively connect said first sensing means to said servomotor means to control the operation thereof, a differential device having two input members movable relative one to the other and a signal output means, clutch means rendered effective by the operation of said switch means in said one sense to operatively connect said servomotor means to said one input member of said differential device, said second sensing means being operatively connected to the other input member of said differential device, first indicator means, said operator-operative switch means being operable in another sense to disconnect said first sensing means from control of the operation of said servomotor means and to connect the signal output means of said differential device to said servomotor means to control the operation thereof, other clutch means rendered effective by the operation of said switch means in said other sense to operatively connect said servomotor means to said first indicator means to effect operation thereof so as to indicate any difference between said condition as thereafter sensed by the second sensing means from that sensed by the first sensing means at the time of opration of the operator-operative switch means in said other sense, second and third indicator means, said operator-operative switch means being operable in a third sense to render said first mentioned clutch means ineffective and to disconnect the signal output means of said differential device from control of the operation of said servomotor means and to reconnect said first sensing means to said servomotor means to control the operation thereof, brake means for said one input member rendered effective by operation of said switch means in said third sense so as to operatively connect said servomotor means to said second indicator means to cause said second indicator means to indicate a change in an increase sense and in a decrease sense in the condition as sensed by said first sensing means, and other means rendered effective by the operation of said switch means in said third sense to operatively connect the signal output means of said differential device to said third indicator means to cause said third indicator means to indicate a change in the condition as sensed by said second sensing means.

3. A warning system comprising first means to sense an operative condition of an aircraft, second means to sense said condition, servomotor means, operator-operative switch means operable in one sense to operatively connect said first sensing means to said servomotor means to control the operation thereof, a differential device having two input members movable relative one to the other, clutch means rendered effective by the operation of said switch means in said one sense to operatively connect said servomotor means to said one input member of said differential device, said second sensing means being operatively connected to the other input member of said differential device, said operator-operative switch means being operable in another sense to render said clutch means ineffective, first and second indicator means, brake means for said one input member rendered effective by the operation of said switch means in said other sense, resilient switch means rendered effective by the operation of said brake means to operatively connect said servomotor means to said first indicator means to indicate a change in an increase sense and in a decrease sense in said condition as sensed by said first sensing means, and other means rendered effective by the operation of said switch means in said other sense to operatively connect said second sensing means through said differential device to said second indicator means so as to indicate a change in said condition as sensed by said second sensing means.

4. A warning system comprising first means to sense an operative condition of an aircraft, second means to sense said condition, first indicator means and second indicator means, a reversible servomotor means having an input to control the direction of operation thereof and an output shaft driven thereby, first operator-operative means including first switch means selectively operative in one sense to connect said first condition sensing means to the input of said servomotor means to control the operation thereof, releasable control means to selectively connect and disconnect the output shaft of said servomotor means to said first indicator means, relay means including second switch means operative thereby to render said control means effective to connect said output shaft of the servomotor means to said first indicator means so as to operatively control said first indicator means to indicate a change in an increase sense and in a decrease sense in said condition as sensed by said first condition sensing means; and said relay means including third switch means operative thereby to connect said second condition sensing means to said second indicator means to indicate a change in said condition as sensed by said second condition sensing means, second operator-operative means including fourth switch means to control said relay means so as to effect said operation of the second and third switch means, and said first operator-operative means including fifth switch means to render the fourth switch means of said second operator-operative means effective upon the operation of said first operator-operative means in the aforesaid one sense.

5. The combination defined by claim 4 including a third indicator means, said first operator-operative means being operative in another sense and including said first switch means being selectively operative thereby to disconnect said first condition sensing means from the input of said servomotor means and connect said second condition sensing means to the input of said servomotor means to control the operation thereof, a releasable coupling means to selectively connect and disconnect the output shaft of said servomotor means to said third indicator means, and sixth switch means selectively operative by said first operator-operative means to cause said coupling means to connect said servomotor to said third indicator means, and said first and sixth switch means being so selectively operated upon rotation of the first operator-operative means in said other sense.

6. A warning and monitoring system comprising first means to sense an operative condition of an aircraft, second means to sense an operative condition of the aircraft, a first clutch means having an input and an output, said first clutch means including locking means effective in an open position of said first clutch means to lock said output of the first clutch means; a first indicating means connected to the output of the first clutch means and indicating a quantity of a signal applied to the output of said first clutch means, a differential device having first and second inputs and an output, servomotor means including an input and an output, switching means to alternately connect outputs of the first condition sensing means and the second condition sensing means to the input of said servomotor means to control operation thereof, said servomotor means including an output connected to the input of the first clutch means and upon the first clutch means being in a closed position to the first indicating device, the output of said servomotor means being connectable with the first input of the differential device, a second clutch means operatively connected between the output of said servomotor means and the first input of the differential device, said second clutch means including locking means effective in an open position of said second clutch means to lock said first input of said differential device, the second condition sensing means being operatively connected to the second input of said differential device, a second indicating means being connectable to the output of the differential device for indicating an output condition of the differential device, a third indicating means connectable to the output of the servomotor means for indicating an output condition of the servomotor means, said switching means being operative in one sense to effectively connect the output of the first condition sensing means to the input of the servomotor means and to cause the second clutch means to open so as to prevent the output of the servomotor means from being applied to the first input of the differential device and so as to thereby render the output of said differential device solely dependent upon said second condition sensing means, said switching means being operative in said one sense to connect the second indicating means to the output of the differential device for indicating a change in the condition sensed by the second condition sensing means, and said switching means being operative in said one sense to operatively connect the third indicating means to the output of the servomotor means so as to indicate changes in the output of said servomotor means, whereby upon operation of said switching means in said one sense, said servomotor means provides an output controlled by said first condition sensing means, said switching means being operative in another sense to cause the first and second clutch means to close, the closing of the first clutch means being effective for connecting the output of the servomotor means to the first indicating means, said switching means being operative in said other sense to disconnect the second indicating means from the output of the differential device, and to disconnect the first condition sensing means from the input of the servomotor means, and said switching means being operative in said other sense to connect the output of the differential device to the input of the servomotor means so as to provide an output from the servomotor means proportional to the difference between the conditions sensed by the first and second condition sensing means, which difference may be indicated on the first indicating means.

7. The combination defined by claim 6 including another differential device to effectively connect the first condition sensing means to said switching means, said other differential device including first, second, and third inputs, said first condition sensing means being operatively connected to said first input to apply a first signal thereto, the output of said first clutch means being operatively connected to said second input to apply a second signal thereto, and the output of said servomotor means being operatively connected to said third input to apply a third signal thereto, and said other differential device including an output connectable through said switching means to the input of said servomotor means for providing a control signal to said servomotor means proportional to the algebraic sum of the signals applied to said first, second, and third inputs.

References Cited in the file of this patent
UNITED STATES PATENTS

| | | |
|---|---|---|
| 2,699,539 | Sylvander | Jan. 11, 1955 |
| 2,794,975 | Sedgfield et al. | June 4, 1957 |
| 2,810,119 | Brown | Oct. 15, 1957 |